(12) United States Patent
Fitzgerald et al.

(10) Patent No.: US 7,781,548 B2
(45) Date of Patent: *Aug. 24, 2010

(54) MICROCHANNEL POLYMERIZATION REACTOR

(75) Inventors: Sean P. Fitzgerald, Columbus, OH (US); David J. Hesse, Columbus, OH (US); Anna Lee Y. Tonkovich, Dublin, OH (US); Laura J. Silva, Plain City, OH (US)

(73) Assignee: Velocys, Inc., Plain City, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/288,571

(22) Filed: Oct. 21, 2008

(65) Prior Publication Data

US 2009/0131612 A1    May 21, 2009

Related U.S. Application Data

(62) Division of application No. 11/073,350, filed on Mar. 2, 2005, now Pat. No. 7,459,508.

(60) Provisional application No. 60/549,423, filed on Mar. 2, 2004.

(51) Int. Cl.
  *C08F 2/00* (2006.01)
  *B01J 19/24* (2006.01)
(52) U.S. Cl. .................. 526/88; 526/918; 422/134; 422/138; 422/228; 137/814
(58) Field of Classification Search ................ 526/88, 526/918; 422/134, 138, 228; 137/814
See application file for complete search history.

(56) References Cited

U.S. PATENT DOCUMENTS 6,162,879 A    12/2000  Galewski 6,380,324 B1 *  4/2002  McFadden et al. ............ 526/64

(Continued)

FOREIGN PATENT DOCUMENTS

DE    199 27 556    12/2000

(Continued)

OTHER PUBLICATIONS

Bayer, et al., Micro mixing effects in continuous radical polymerization, IMRET3 Third Intern'l Conf. on Microcreation Technology, Apr. 1999, pp. 165-170, Adventis Research & Technologies GmBH & Co KG, Frankfurt am Main, Germany.

(Continued)

*Primary Examiner*—Fred M Teskin
(74) *Attorney, Agent, or Firm*—Taft Stettinius & Hollister LLP

(57) ABSTRACT

A microchannel polymerization reactor comprising: (a) a first microchannel adapted to carry a reactant stream; (b) a fluid conduit adapted to carry a fluid in thermal communication with the first microchannel; and (c) a static mixer in fluid communication with the first microchannel adapted to provide a mixing zone operative to change the cross-sectional fluid flow profile at a predetermined point along the first microchannel without changing the primary direction of the reactant stream through the first microchannel. The present invention also includes a method of carrying out a polymerization reaction within a microchannel reactor comprising: (i) directing at least one of monomer, initiator, water, surfactant, coagulant, and solvent into a reactant stream and into contact with reactant flowing within a first microchannel to initiate a polymerization reaction occurring within a first microchannel; and (ii) mixing the reactant of the reactant stream by positioning at least one static mixer in series with the reactant stream, where the static mixer is adapted to change a cross-sectional fluid flow profile of the reactant stream flowing through the first microchannel without changing a primary direction of the reactant stream through the first microchannel.

37 Claims, 8 Drawing Sheets

U.S. PATENT DOCUMENTS

| | | | |
|---|---|---|---|
| 6,555,629 | B1 | 4/2003 | Pysall et al. |
| 6,969,746 | B2 | 11/2005 | Krull et al. |
| 6,989,134 | B2 | 1/2006 | Tonkovich et al. |
| 7,234,514 | B2 | 6/2007 | Vogel |
| 7,459,508 | B2 | 12/2008 | Fitzgerald et al. |
| 2003/0072699 | A1 | 4/2003 | Tonkovich et al. |
| 2003/0096268 | A1 | 5/2003 | Weiner et al. |
| 2003/0103879 | A1 | 6/2003 | Jahn et al. |
| 2003/0152488 | A1 | 8/2003 | Tonkovich et al. |
| 2004/0034266 | A1* | 2/2004 | Brophy et al. ............... 585/658 |
| 2004/0076562 | A1 | 4/2004 | Manzanec et al. |
| 2004/0143059 | A1 | 7/2004 | Cabrera |
| 2005/0112606 | A1 | 5/2005 | Fuchs et al. |
| 2005/0245628 | A1 | 11/2005 | Hubel et al. |
| 2006/0235170 | A1 | 10/2006 | Iwasaki et al. |
| 2006/0241242 | A1 | 10/2006 | Devlin et al. |

FOREIGN PATENT DOCUMENTS

| | | |
|---|---|---|
| EP | 1 650 228 | 4/2006 |
| WO | WO 02/064248 | 8/2002 |
| WO | WO 02/089965 | 11/2002 |
| WO | WO 03/037501 | 5/2003 |
| WO | WO 03/068400 | 8/2003 |
| WO | WO 2004/016348 | 2/2004 |
| WO | WO 2004/037418 | 5/2004 |
| WO | WO 2004/052518 | 6/2004 |
| WO | PCT/US2005/007043 | 6/2005 |
| WO | PCT/US2005/007043 | 2/2008 |

OTHER PUBLICATIONS

Janicke, et al., The Controlled Oxidation of Hydrogen from an Explosive Mixture of Gases Using a Microstructured Reactor/Heat Exchanger and Pt/Al2O3 Catalyst, Journal of Catalysis, 2000, pp. 282-293, 191, Academic Press, www.idealibrary.com.

Ling, et al., Kinetics simulation of high viscous styrene bulk polymerization system, European Polymer Journal, 2001, pp. 2407-2411, 37. Elsevier Science Ltd., www.elsevier.com/locate/europolj.

Nisisako, et al., Rapid Preparation of Monodispersed Droplets with Confluent Laminar Flows. IEEE, 2003, pp. 331-334, Dept. of Precision Engineering, Grad. School of Eng., U. of Tokyo, Japan.

Sugiura, et al., Synthesis of Polymeric Microspheres with Narrow Size Distributions Employing Microchannel Emulsification, Macromolecular Rapid Communications, 2001, pp. 773-778, 22, No. 10, Wiley-VCH Verlag GmbH, Germany.

Wu, et al., A New Sythetic Method for Controlled Polymerization Using A Microfluidic Sytem, J. Am. Chem. Soc., 2004, pp. 9880-9881, vol. 126, No. 32, JACS Communications, American Chemical Society, USA.

* cited by examiner

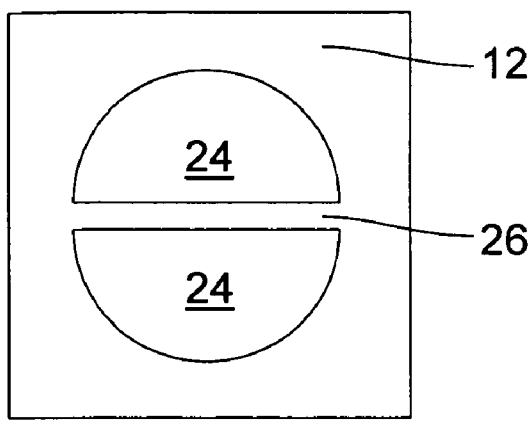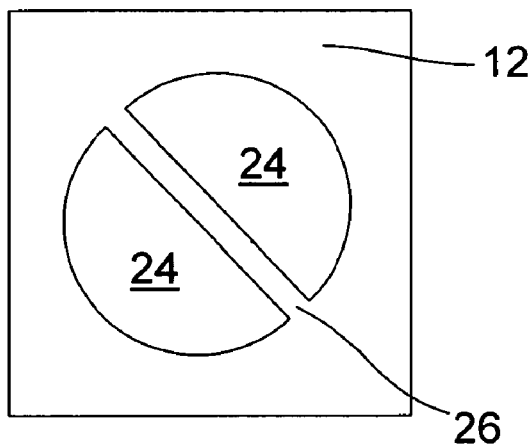
FIG. 2
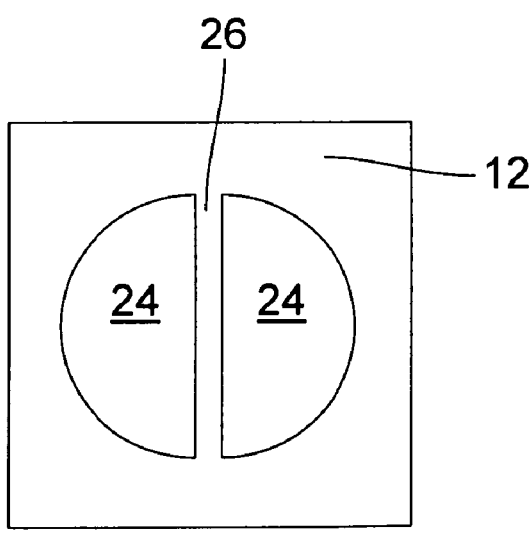

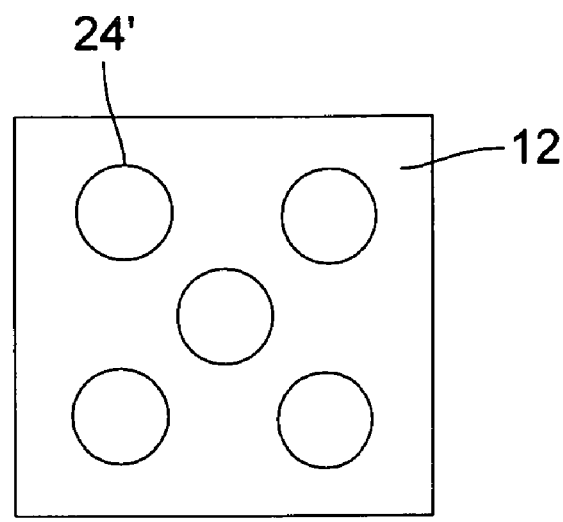
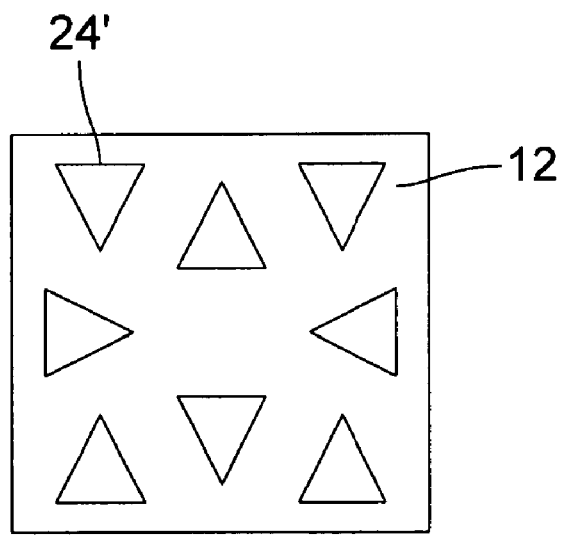
FIG. 3
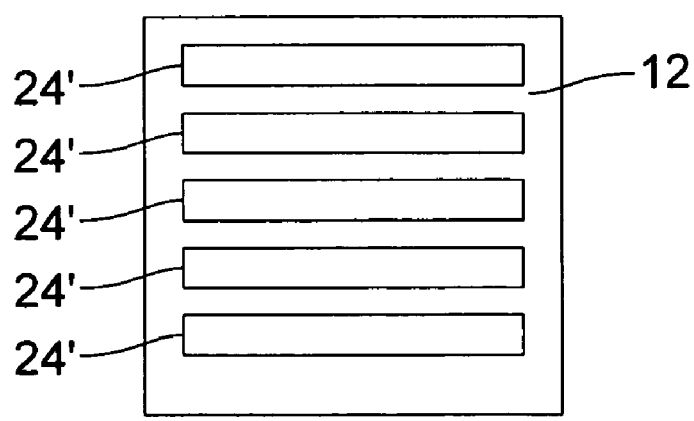

MICROCHANNEL POLYMERIZATION REACTOR

CROSS REFERENCE TO RELATED APPLICATIONS

This is a divisional application of application Ser. No. 11/073,350, filed Mar. 2, 2005, now U.S. Pat. No. 7,459,508, which claims the benefit of U.S. Provisional Patent application Ser. No. 60/549,423, filed Mar. 2, 2004, and entitled "MICROCHANNEL POLYMERIZATION REACTOR," the disclosures of which are incorporated herein by reference.

RELATED ART

1. Field of the Invention

The present invention is directed to continuous polymerization processes and, more specifically, to bulk, solution, suspension and emulsion polymerization processes utilizing one or more microchannels.

2. Analogous Art

Industrial continuous polymerization processes include, without limitation, bulk, solution, suspension and emulsion polymerization. Bulk polymerization, also called mass or block polymerization, includes monomer, polymer, and initiator. In bulk polymerization the reactant contents are all available to react, so good mixing and heat removal is vital for maintaining control and optimization of the reaction. It is very important to control the reaction rate of polymer chain propagation for bulk polymerization systems, otherwise the reactant contents may exhibit massive chain growth resulting in large exothermic heat releases and drastic reduction in the chain termination reaction step resulting from viscosity changes, commonly referred to as the Trommsdorff effect. The Trommsdorff effect may lead to a large increase in viscosity of the reactant contents thereby rendering the contents difficult to pump, as well as leading to large molecular weight polymers that can skew the molecular weight distribution.

Solution polymerization tries to avoid the Trommsdorff effect by adding solvent to dilute the reactant contents. The Trommsdorff effect may be delayed by controlling the monomer and initiator flows in both bulk and solution polymerization, as well as removing any unreacted monomer and remaining solvent.

Emulsion and solution polymerization typically use similar means of temperature control as a continuous phase surrounds dispersed organic phases in which the polymerization reaction takes place. The continuous phase helps maintain the temperature by utilization of water having a relatively high thermal conductivity and heat capacity.

SUMMARY

The present invention is directed to continuous polymerization processes and, more specifically, to bulk, solution, suspension and emulsion polymerization processes utilizing one or more microchannels. The present invention carries out a polymerization reaction within a plurality of microchannels distributed throughout a polymerization reactor. Static mixers may be oriented to be in fluid communication with the microchannels, thereby providing mixing of reaction stream components within the microchannels themselves. The present invention also makes use of porous materials incorporated into a microchannel polymerization reactor. Reference is had to the Detailed Description for a more encompassing understanding of the present invention.

It is a first aspect of the present invention to provide a microchannel polymerization reactor comprising: (a) a first microchannel adapted to carry a reactant stream; (b) a fluid conduit adapted to carry a fluid in thermal communication with the first microchannel; and (c) a static mixer in fluid communication with the first microchannel adapted to provide a mixing zone operative to change the cross-sectional fluid flow profile at a predetermined point along the first microchannel without changing the primary direction of the reactant stream through the first microchannel.

In a more detailed embodiment of the first aspect, the static mixer is operative to change the cross-sectional area available for fluid flow at the predetermined point. In yet another more detailed embodiment, the static mixer increases the cross-sectional area available for fluid flow at the predetermined point, the cross-sectional area available for fluid flow prior to the predetermined point is at least one of generally rectangular, generally circular, generically semicircular, and generally oblong, and the cross-sectional area available for fluid flow subsequent to the predetermined point is at least one of generally rectangular, generally circular, generically semicircular, and generally oblong. In a further detailed embodiment, the static mixer is operative to split the first microchannel into a plurality of microchannels. In still a further detailed embodiment. In a more detailed embodiment, the static mixer decreases the cross-sectional area available for fluid flow at a predetermined point along the first microchannel, the cross-sectional area available for fluid flow prior to the predetermined point is at least one of generally rectangular, generally circular, generically semicircular, and generally oblong, and the cross-sectional area available for fluid flow subsequent to the predetermined point is at least one of generally rectangular, generally circular, generically semicircular, and generally oblong.

In yet another more detailed embodiment of the first aspect, the static mixer is at least one of mounted to a wall of the first microchannel and resides within the first microchannel, and the static mixer is oriented normal to the primary direction of fluid flow through the first microchannel. In still another more detailed embodiment, the static mixer is at least one of mounted to a wall of the first microchannel and resides within the first microchannel, and the static mixer extends at least partially in parallel with the primary direction of fluid flow through the first microchannel. In a further detailed embodiment, the invention further includes a third microchannel in fluid communication with the first microchannel and adapted to deliver at least one of monomer, initiator, water, surfactant, coagulant, and solvent to the reactant stream. In still a further detailed embodiment, a third microchannel includes a plurality of orifices in direct communication with the first microchannel to deliver at least one of monomer, initiator, water, surfactant, coagulant, and solvent to the reactant stream at multiple points along the first microchannel. In a more detailed embodiment, at least one of the plurality of orifices is sized to compensate for a pressure drop associated with at least one of monomer, initiator, water, surfactant, coagulant, and solvent delivered into the reactant stream, where a higher pressure drop corresponds to a larger orifice and a smaller pressure drop corresponds to a smaller orifice. In a more detailed embodiment, the microchannel polymerization reactor includes a plurality of first microchannels having a reactant stream flowing therein, where each of the plurality of first microchannels includes a static mixer in series therewith, and the static mixer in series with at least one of the plurality of first microchannels is operative to change the cross-sectional area available for fluid flow at a predetermined point along at least one of the plurality of first microchannels.

In a more detailed embodiment of the first aspect, the invention further includes a third microchannel, a fourth microchannel, and a fifth microchannel in fluid communication with the first microchannel and operative to deliver at least one of monomer, initiator, water, surfactant, coagulant, and solvent to the reactant stream at multiple points along the first microchannel, the third microchannel, the fourth microchannel, and the fifth microchannel are spaced about the first microchannel, and where the first microchannel, the third microchannel, the fourth microchannel, the fifth microchannel, and the sixth microchannel combine to provide a repeating unit adapted to be replicated to scale up a microchannel polymerization reactor. In yet another more detailed embodiment, the third microchannel includes an orifice sized to compensate for a pressure drop associated with monomer delivered to the reactant stream via the third microchannel, where a higher pressure drop corresponds to a larger orifice and a smaller pressure drop corresponds to a smaller orifice, the fourth microchannel includes an orifice sized to compensate for a pressure drop associated with initiator delivered to the reactant stream via the fourth microchannel, where a higher pressure drop corresponds to a larger orifice and a smaller pressure drop corresponds to a smaller orifice, and the fifth microchannel includes an orifice sized to compensate for a pressure drop associated with solvent delivered to the reactant stream via the fifth microchannel, where a higher pressure drop corresponds to a larger orifice and a smaller pressure drop corresponds to a smaller orifice.

In yet another more detailed embodiment of the first aspect, the microchannel polymerization reactor includes a plurality of first microchannels having a reactant stream flowing therein, where each of the plurality of first microchannels includes a static mixer in series therewith, and each static mixer is mounted to a wall of at least one of the plurality of first microchannels, and at least one static mixer is oriented normal to the primary direction of fluid flow through the first microchannel. In still another more detailed embodiment, the microchannel polymerization reactor includes a plurality of first microchannels having a reactant stream flowing therein, where each of the plurality of first microchannels includes a static mixer in series therewith, and each static mixer is mounted to a wall of at least one of the plurality of first microchannels; and at least one static mixer extends at least partially in parallel with the primary direction of fluid flow through at least one of the plurality of first microchannels. In a further detailed embodiment, the invention further includes a plurality of first microchannels having a reactant stream flowing therein, where each of the plurality of first microchannels includes a static mixer in series therewith, and a plurality of third microchannels in fluid communication with the plurality of first microchannels and adapted to deliver at least one of monomer, initiator, water, surfactant, coagulant, and solvent to the reactant stream.

In a more detailed embodiment of the first aspect, a third microchannel includes a plurality of orifices in direct communication with the first microchannel to deliver at least one of monomer, initiator, water, surfactant, coagulant, and solvent to the reactant stream at multiple points along the first microchannel. In yet another more detailed embodiment, at least one of the plurality of orifices is sized to compensate for a pressure drop associated with at least one of monomer, initiator, water, surfactant, coagulant, and solvent delivered into the reactant stream, where a higher pressure drop corresponds to a larger orifice and a smaller pressure drop corresponds to a smaller orifice. In a further detailed embodiment, the invention further includes a plurality of first microchannels having a reactant stream flowing therein, where each of the plurality of first microchannels includes a static mixer in series therewith, a plurality of third microchannels, a plurality of fourth microchannels, and a plurality of fifth microchannels in fluid communication with the plurality of first microchannels and operative to deliver at least one of monomer, initiator, water, surfactant, coagulant, and solvent to the reactant stream at multiple downstream points, the plurality of third microchannels, the plurality of fourth microchannels, and the plurality of fifth microchannels are spaced about the plurality of first microchannels, and where the plurality of first microchannels, the plurality of third microchannels, the plurality of fourth microchannels, and the plurality of fifth microchannels combine to provide a repeating unit adapted to be replicated to scale up a microchannel polymerization reactor.

In yet another more detailed embodiment of the first aspect, the third microchannel includes an orifice sized to compensate for a pressure drop associated with monomer delivered to the reactant stream via the third microchannel, where a higher pressure drop corresponds to a larger orifice and a smaller pressure drop corresponds to a smaller orifice, the fourth microchannel includes an orifice sized to compensate for a pressure drop associated with initiator delivered to the reactant stream via the fourth microchannel, where a higher pressure drop corresponds to a larger orifice and a smaller pressure drop corresponds to a smaller orifice, and the fifth microchannel includes an orifice sized to compensate for a pressure drop associated with solvent delivered to the reactant stream via the fifth microchannel, where a higher pressure drop corresponds to a larger orifice and a smaller pressure drop corresponds to a smaller orifice. In still another more detailed embodiment, the fluid conduit includes a second microchannel, the second microchannel is transverse to the first microchannel, and the second microchannel is adapted to carry a thermal energy transfer fluid in thermal communication with the reactant stream flowing within the first microchannel. In a further detailed embodiment, the fluid conduit includes a second microchannel, the second microchannel is parallel to the first microchannel, and the second microchannel is adapted to carry a thermal energy transfer fluid in thermal communication with the reactant stream flowing within the first microchannel, where the thermal energy transfer fluid is adapted to flow in at least one of a concurrent direction with the direction of flow of the reactant stream and a countercurrent direction generally opposite the direction of flow of the reactant stream.

In a more detailed embodiment of the first aspect, the invention further includes a porous medium in fluid communication with the first microchannel to inhibit polymer product from a polymerization reaction from passing therethrough, while enabling at least one of monomer, initiator, water, surfactant, coagulant, and solvent to pass therethrough. In yet another more detailed embodiment, the first microchannel is bounded by metallic walls and the static mixer is fabricated at least in part from a metallic material.

It is a second aspect of the present invention to provide a method of carrying out a polymerization reaction within a microchannel reactor comprising: (a) directing at least one of monomer, initiator, water, surfactant, coagulant, and solvent into a reactant stream and into contact with reactant flowing within a first microchannel to initiate a polymerization reaction occurring within a first microchannel; and (b) mixing the reactant of the reactant stream by positioning at least one static mixer in series with the reactant stream, where the static mixer is adapted to change a cross-sectional fluid flow profile of the reactant stream flowing through the first microchannel without changing a primary direction of the reactant stream through the first microchannel.

In a more detailed embodiment of the second aspect, the act of directing at least one of monomer, initiator, water, surfactant, coagulant, and solvent into the reactant stream includes providing a second microchannel carrying at least one of the monomer, the initiator, the water, the surfactant, the coagulant, and the solvent, where the second microchannel includes an orifice adapted to direct at least one of the monomer, the initiator, the water, the surfactant, the coagulant, and the solvent into the reactant stream at a predetermined point along the first microchannel. In yet another more detailed embodiment, the act of directing at least one of the monomer, the initiator, the water, the surfactant, the coagulant, and the solvent into the reactant stream includes providing a second microchannel carrying at least one of the monomer, the initiator, the water, the surfactant, the coagulant, and the solvent, where the second microchannel includes a plurality of orifices adapted to direct at least one of the monomer, the initiator, the water, the surfactant, the coagulant, and the solvent into the reactant stream at predetermined points along the first microchannel. In a further detailed embodiment, the method further includes cooling the first microchannel by providing a fluid in thermal communication with the first microchannel that is adapted to carry away thermal energy from the reactant stream. In still a further detailed embodiment, the first microchannel is bounded by metallic walls and the at least one static mixer is fabricated at least in part from a metallic material, and the act of cooling the first microchannel includes conductive heat transfer from the at least one static mixer to the metallic walls of the first microchannel.

In yet another more detailed embodiment of the second aspect, the method further includes filtering polymer product from at least one of the monomer, the initiator, the water, the surfactant, the coagulant, and the solvent. In still another more detailed embodiment, the act of filtering polymer product includes positioning a permeable membrane in fluid communication with the first microchannel. In a further detailed embodiment, the act of directing at least one of the monomer, the initiator, the water, the surfactant, the coagulant, and the solvent into a reactant stream includes injecting at least one of the monomer, the initiator, the water, the surfactant, the coagulant, and the solvent normal to the primary direction. In still a further detailed embodiment, the method further includes replicating the directing and mixing acts to scale up the polymerization reaction. In yet a further detailed embodiment, the method further includes directing a heat transfer fluid into thermal communication with products of the polymerization reaction to thermally quench the products. In still a further detailed embodiment, the act of directing a heat transfer fluid into thermal communication with products of the polymerization reaction to thermally quench the products includes directing the heat transfer fluid into intimate contact with the products of the polymerization reaction.

It is a third aspect of the present invention to provide a microchannel polymerization reactor comprising a plurality of metallic sheets each fabricated to be sequentially mounted to one another to provide a microchannel polymerization reactor comprising a first plurality of microchannel conduits, with each respective microchannel conduit including a static mixer in fluid communication therewith, where each static mixer is adapted to provide a mixing zone operative to change the cross-sectional fluid flow profile at a predetermined point along a respective microchannel conduit without changing a primary direction of fluid flow through the respective microchannel conduit, and where each static mixer is operative to at least one of change the cross-sectional area available for fluid flow through the respective microchannel conduit at the predetermined point and change the cross-sectional profile of the respective microchannel conduit at the predetermined point.

In a more detailed embodiment of the first aspect, the invention further includes a second plurality of microchannel conduits adapted to be in fluid communication with the first plurality of microchannel conduits and direct at least one of monomer, initiator, water, surfactant, coagulant, and solvent into the first plurality of microchannel conduits. In yet another more detailed embodiment, the invention further includes a porous medium in fluid communication with the first plurality of microchannel conduits and the second plurality of microchannel conduits, the porous medium interposing the first plurality of microchannel conduits and the second plurality of microchannel conduits to inhibit polymer product within the first plurality of microchannel conduits from passing into at least one of the second plurality of microchannel conduits.

BRIEF DESCRIPTION OF THE DRAWINGS

FIG. 2 is a frontal view of exemplary sheets for use with the present invention having the same static mixing feature oriented in differing manners;

FIG. 3 is a frontal view of exemplary sheets for use with the present invention having differing static mixing features;

DETAILED DESCRIPTION

The exemplary embodiments of the present invention are described and illustrated below to encompass continuous polymerization processes and, more specifically, to bulk, solution, suspension, and emulsion polymerization processes carried out within one or more microchannels. Of course, it will be apparent to those of ordinary skill in the art that the preferred embodiments discussed below are exemplary in nature and may be reconfigured without departing from the scope and spirit of the present invention. However, for clarity and precision, the exemplary embodiments as discussed below may include optional steps, methods, and features that one of ordinary skill should recognize as not being a requisite to fall within the scope of the present invention.

One design consideration for bulk and solution polymerization reactors is developing and maintaining the proper mixing of the reactants. This can be especially important as the polymerization reactions proceed and the mixture becomes increasingly viscous, thereby potentially limiting the effectiveness of convective heat and mass transfer.

The present invention makes use of microchannels to improve heat and mass transfer, even in the laminar flow regime, as a result of the relatively small cross-sectional areas of the microchannels. Microchannels falling within the scope of the present invention include, without limitation, channels having a cross-sectional area available for fluid flow with a dominant dimension thereof typically less than two millimeters. For purposes of simplicity and to facilitate a complete understanding of the invention, the present invention will be discussed with respect to segments or repeating units that are intended to be replicated in a manner commensurate with the desired scale.

Figure 1:
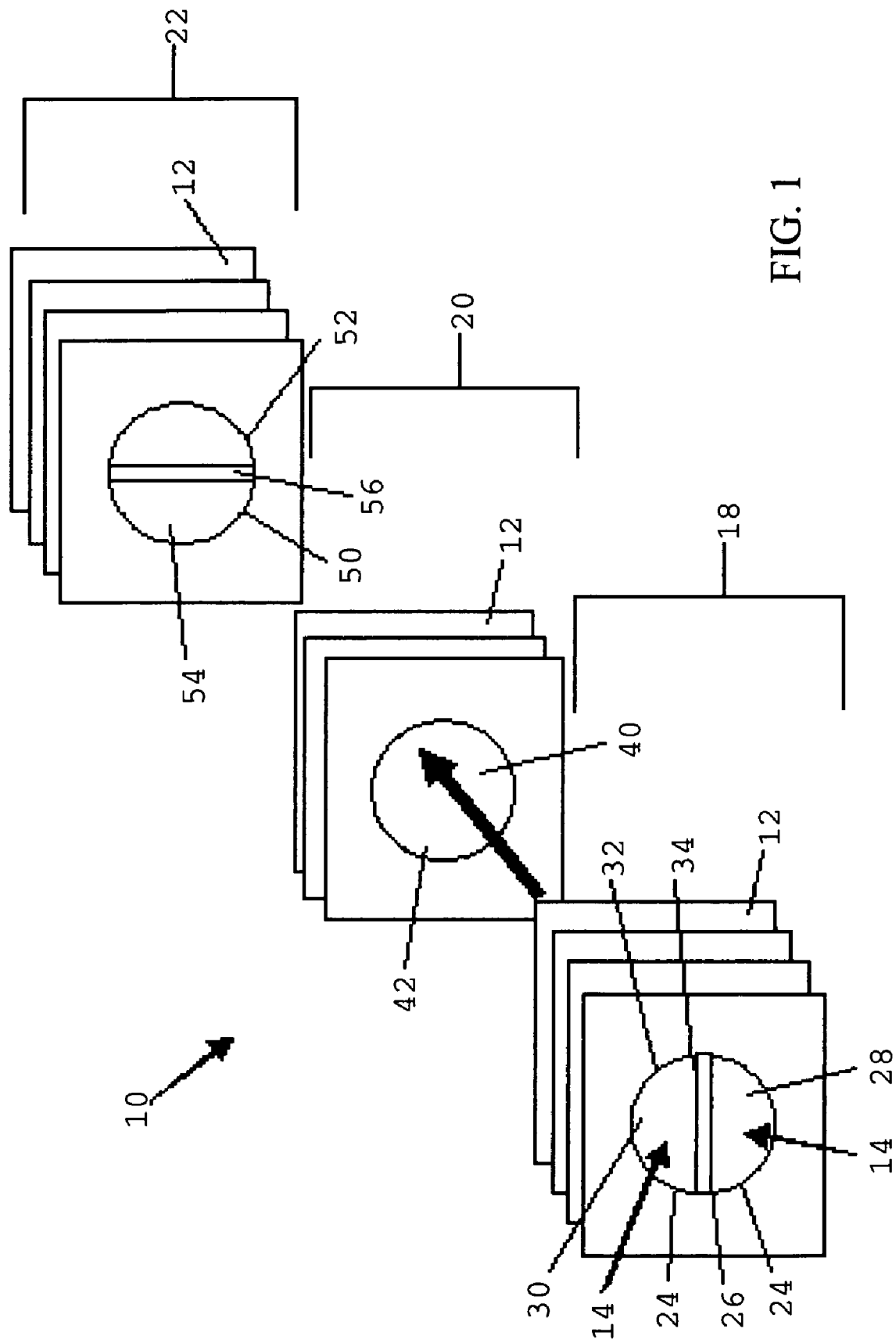
FIG. 1 is an exploded view of a segment of a first exemplary embodiment of the present invention.

Referencing FIG. 1, a first exemplary segment 10 of the present invention includes a plurality of stacked metallic sheets 12 that are fabricated and assembled in a predetermined sequence to provide a labyrinth of microchannel fluid conduits 14. Reference is had to U.S. Patent Application Publication No. 2003/0152488, the disclosure of which is incorporated herein by reference, for an explanation of fabricating and sequentially assembling metallic sheets 12 to provide a labyrinth of microchannel fluid conduits 14. For purposes of the instant disclosure, a "microchannel" has at least one dimension of 2 mm or less. In this exemplary segment 10, the sequential assembly of the stacked sheets 12 provides three mixing zones 18, 20, 22.

The first mixing zone 18 includes a series of sheets 12 each having mirror image semicircular openings 24 separated by a horizontal divider 26. In this exemplary embodiment, the sheets 12 are sequentially assembled so that the horizontal divider 26 of each sheet 12 overlaps the horizontal divider of an adjacent sheet 12. The resulting assembly of four sheets 12 cooperate to create two respective microchannels 28, 30 that are each bounded by the circumferential walls 32 of the openings 24 and the horizontal wall 34 of the divider 26. At least the first divider 26 in the series of stacked sheets 12 is operative to provide a static mixer 26 facilitating mixing of the contents flowing through each microchannel 28, 30. For purposes of the present invention, a static mixer 26 includes one or more static mixing features that are mounted to or contained within a fluid conduit and operative to generate vortices that disturb fluid flow within the conduit. As used with respect to the present invention static mixing features include, without limitation, porous media, fluid jets, and any other structure operative to generate and/or sustain eddies.

Referring to FIG. 2, it is also within the scope of the invention that the sheets 12 of the first mixing zone 18 are assembled in a manner where the dividers 26 or other static mixing features 26 of a first sheet 12 do not completely overlap the dividers 26 or other static mixing features 26 of an adjacent sheet 12. An exemplary circumstance may include rotation at a predetermined angle of the openings 24 formed through successive sheets 12 or fabrication of successive sheets to have static mixing features 26 that cannot completely overlap, regardless of the orientation (not shown).

Referencing FIG. 3, it is also within the scope of the invention that the sheets 12 of the first mixing zone 18 are fabricated to provide openings 24' other than in a semicircular shape. Examples of openings 24' that may be fabricated through the sheets 12 include, without limitation, circular openings, triangular openings, and rectangular openings. It is to be understood that a multitude of opening shapes and stacked orientations will produce various static mixing features 26 that are amendable to incorporation within the present invention.

Consulting FIG. 1 again, a second exemplary mixing zone 20, adjacent to the first mixing zone 18 upon assembly, comprises a plurality of stacked sheets 12 each having a circular opening 40 that adapted to be aligned with the circular opening 40 of an adjacent sheet 12. The change in cross-sectional area and cross-sectional profile from the last sheet 12 of the first mixing zone 18 to the first sheet of the second mixing zone 20 disrupts the boundary layers formed within the polymerization process microchannels of the first mixing zone 20. While not necessary, the circular opening 40 of each sheet 12 of the second mixing zone 20 generally corresponds to the dimensions of the openings 24 through the sheets 12 comprising the first mixing zone 18, excluding the divider 26. The cross-sectional area of each sheet opening 40 is adapted to be the same for all sheets comprising the second mixing zone 20 in order to define a microchannel 42 having a generally constant cross-sectional area and cross-sectional profile. It is to be understood, however, that the constant cross-sectional area and constant cross-sectional profile is by no means a necessity to fabricate a mixing zone in accordance with the present invention. In an exemplary form, the microchannel 42 of the second mixing zone 20 is fed by the two upstream microchannels 28, 30 that direct fluid from the respective streams into communication with one another resulting in mixing of the streams prior to entering the third mixing zone 22. Those of ordinary skill will readily understand that the polymerization reaction carried out within the microchannel 42 may dictate that the second mixing zone 20 have a particular length, cross-section, and/or include static mixing features. Therefore, the dimensions of this second mixing zone 20, as well as the other mixing zones of the present invention including the number of sheets comprising a mixing zone, may vary and be within the purview of one of ordinary skill.

The third mixing zone 22 includes a series of stacked sheets 12 that cooperate to divide the stream exiting the second mixing zone 20 into two respective microchannels 50, 52. Each sheet 12 of the third mixing zone 22 includes a pair of semicircular openings 54 that are divided by a static mixing feature 56. The sheets 12 are adapted to be sequentially mounted to one another so that the mixing feature 56 of each sheet overlies the adjacent mixing feature 56 of an adjoining sheet 12, thereby forming the two respective microchannels 50, 52. As discussed previously, static mixing features 56 are incorporated to generate vortices that disturb fluid flow entering the microchannels 50, 52 in order to reset the boundary layers in the polymerization process microchannels. It is to be understood that the dimensions of the third mixing zone 22, as well as those of the openings 54 through each sheet 12, are within the purview of those of ordinary skill.

The first exemplary embodiment 10 may be replicated and reconfigured in a large array of stacked sheets 12 to reach a commercially desired processing capacity or desired mixing. Incorporation of static mixing features results in disruption of the boundary layers of the fluid streams flowing through the microchannels to approach a plug flow profile in the direction normal to flow that ensures proper mixing. It should be noted that placement of the static mixing features may take into account changes in viscosity that result from the progression of the polymerization reactions by changing the length of zones 18, 20, 22 as a function of position along the length of the microchannels. It may be useful to decrease the length of zones 18, 20, 22 as the fluid becomes more viscous.

Static mixing features of the present invention may also be utilized to provide greater surface area for thermal energy transfer to or from a stream in contact with the features. For example, extension of a static mixer feature 26 into the center of a microchannel allows thermal energy to be carried to or away from the center of the channel, thereby potentially removing a potential "hot spot" from the reacting fluid stream that might give rise to the Trommsdorff effect.

It is also within the scope of the invention to provide one or more fluid channels (not shown) in thermal communication with the microchannels to facilitate heat transfer therebetween. The exemplary heat transfer channels may include heat exchanger conduits such as, without limitation, microchannels that are interleaved between the microchannels carrying the polymerization reaction contents. Those of ordinary skill are familiar with the plethora of heat transfer fluids that may be utilized to draw off excess exothermic energy generated as the polymerization reaction progresses within the microchannels or to remove thermal energy generated from friction between viscous fluids and the static mixing features.

It is further within the scope of the invention to include only one mixing zone 18, 20, 22 or to reorganize the mixing zones such as, without limitation, by omitting one or two of the mixing zones 18, 20, 22. Those of ordinary skill will also understand that replication of the mixing zones 18, 20, 22 is within the scope of the present invention.

Figure 4:
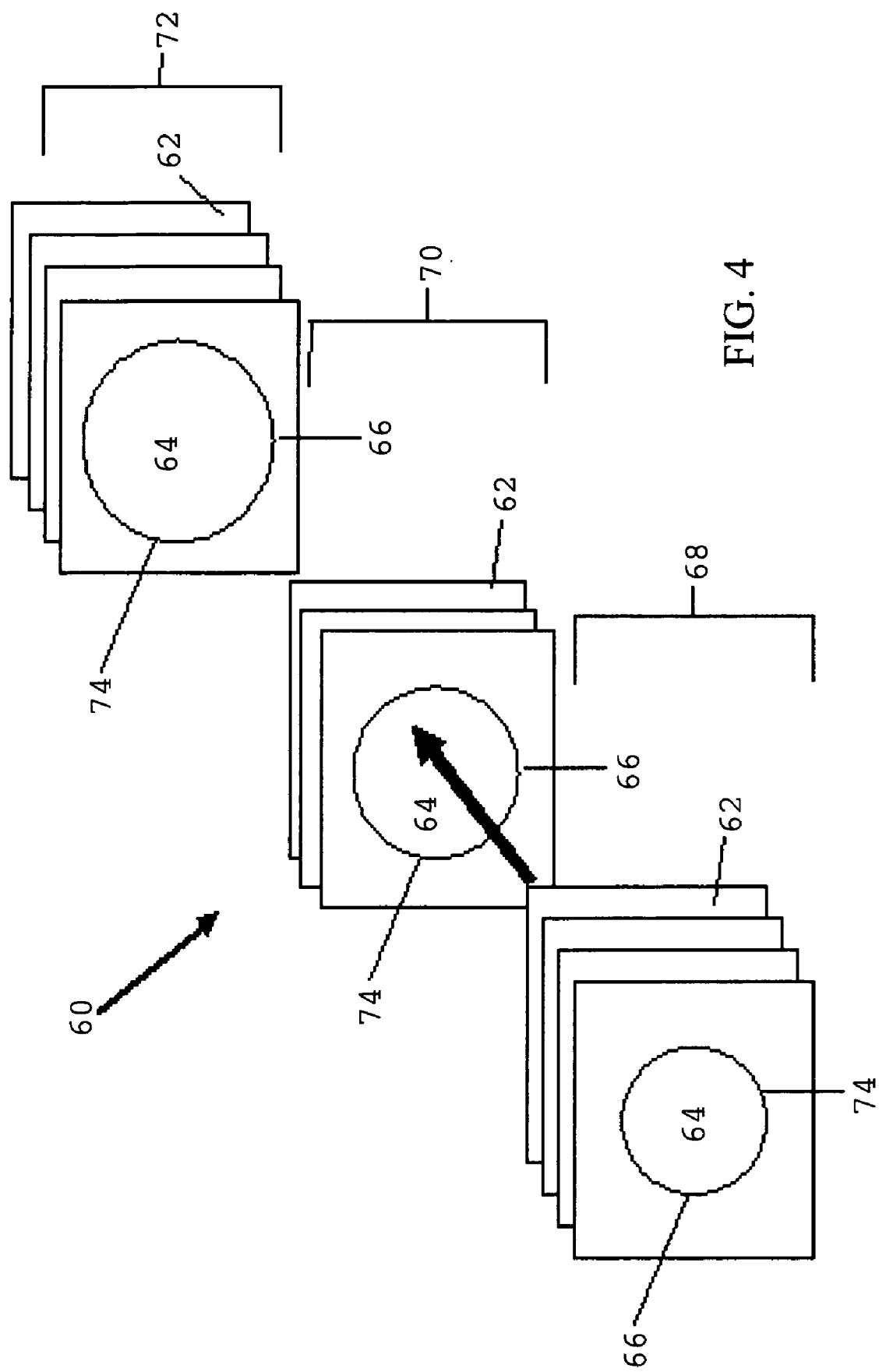
FIG. 4 is an exploded view of a segment of an alternate first exemplary embodiment of the present invention.

Referring to FIG. 4, an alternate first exemplary embodiment 60 includes a plurality of stacked sheets 62 that define at least one cylindrical microchannel 64 adapted to carry the reactants of a polymerization reaction. The sheets 62 include static mixing features 66 that amend the cross-sectional area and cross-sectional profile available for fluid flow, thereby disrupting the boundary layers associated with each mixing zone 68, 70, 72. In this first alternate exemplary embodiment, the static mixing features include varying the diameter of the circular opening 74 of successive mixing zones 68, 70, 72 in order to provide a series of various cylindrical sections accommodating the flow of the reaction contents of the polymerization reaction.

It is also within the scope of the invention that the alternate first exemplary embodiment 60 include other static mixing features, such as those shown and described in the first exemplary embodiment 10. In addition, it is also within the scope of the invention to provide one or more fluid channels (not shown) in thermal communication with the microchannel 64 to facilitate heat transfer therebetween.

Referencing FIGS. 1 and 4, the first exemplary embodiments 10, 60 are fabricated to withstand polymerization reactions occurring at elevated pressures. In exemplary form, the microchannels are oriented in the orthogonal direction and achieve round features that reduce stresses upon the features that maintain the orientation between successive sheets and minimize the amount of surrounding material needed for pressure containment.

An additional design feature that orthogonal bonding gives is the ability to increase or decrease the microchannel dimensions in the direction of flow. If the microchannel dimensions are increased in the direction of flow and are operative to maintain acceptable heat and mass transfer, the length of the polymerization process microchannel may be reduced. This may be particularly useful for situations where mass such as, without limitation, monomer, initiator, water, surfactant, coagulant, and solvent is added to the polymerization process microchannel.

Figure 5:
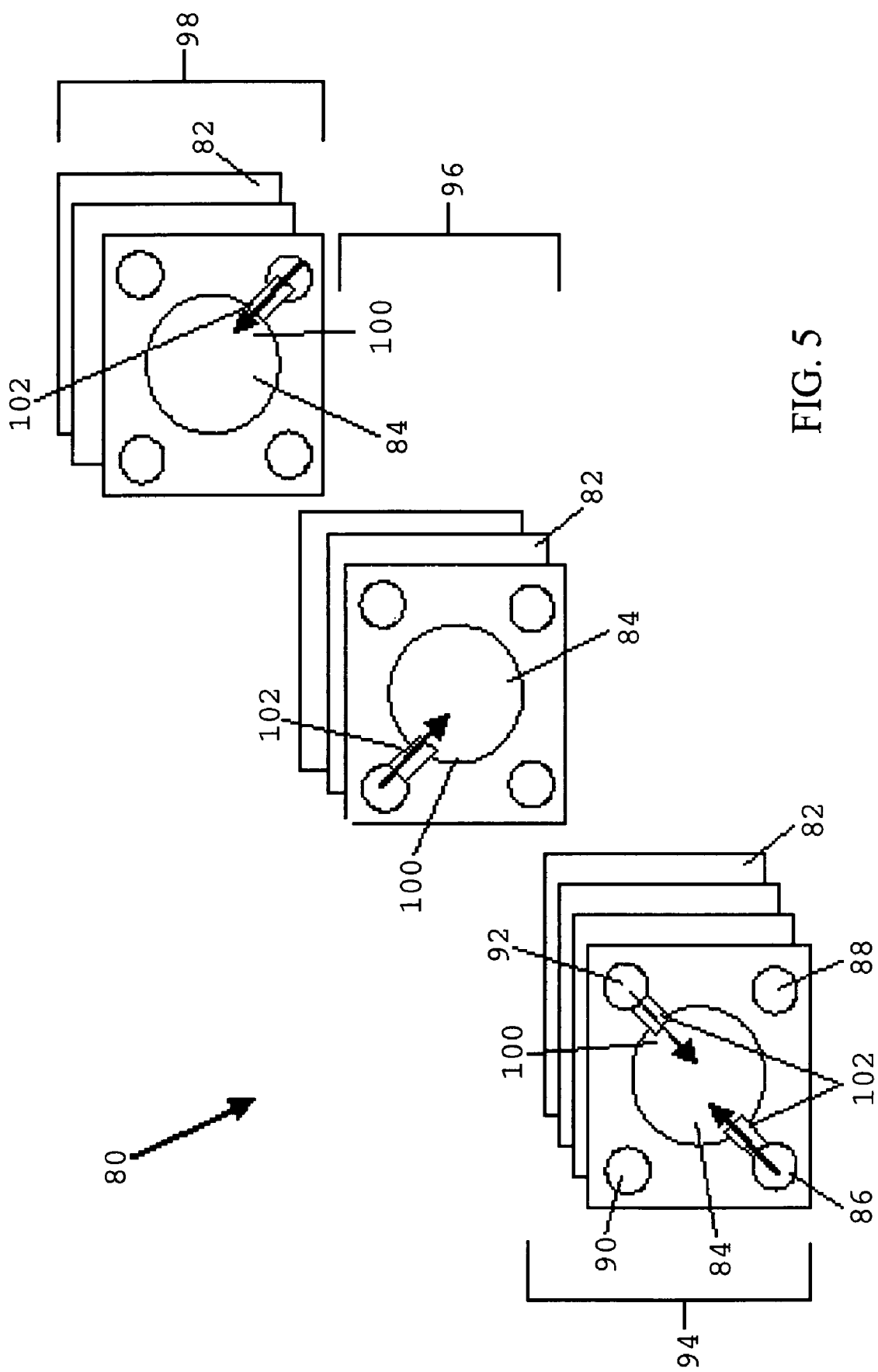
FIG. 5 is an exploded view of a segment of a second exemplary embodiment of the present invention.

Referencing FIG. 5, a second exemplary embodiment 80 includes a plurality of metallic sheets 82 that are adapted to be laminated together to provide at least one polymerization process microchannel 84 therethrough. The sheets also provide at least one additive conduit in fluid communication with the microchannel 84. In an exemplary form, the sheets 82 include four additive conduits 86, 88, 90, 92 in fluid communication with the polymerization process microchannel 84, where two of the additive conduits 86, 92 are adapted to supply monomer, another conduit is adapted to supply initiator 90, and a further conduit 88 is adapted to supply solvent to the stream flowing within the microchannel 84. For purposes of explanation only, each location along the microchannel 84 where additive is directed into the stream flowing therein is called an additive zone.

In this exemplary embodiment 80, three additive zones 94, 96, 98 denote the locations where monomer, initiator, and solvent are added to stream flowing within the polymerization process microchannel 84 in a distributed feed form to increase overall conversion of monomer within the polymerization process microchannel 84. More specifically, monomer may be added upstream from initiator, which is added upstream from solvent, however, it is to be understood that replication of the additive zones 94, 96, 98 may modify this general upstream/downstream description. Replication of these additive zones 94, 96, 98 may be used to tailor the polymer molecular weight to a desired range.

The distributed conduits 86, 88, 90, 92 are in fluid communication with the polymerization process microchannel 84 at selected points along the length of the microchannel. The conduits 86, 88, 90, 92 may be oriented in parallel to the direction of the polymerization process microchannel 84, or may be aligned perpendicular, such as in a cross flow manner, to the polymerization process microchannel 84.

Control of additive distribution between the conduits 86, 88, 90, 92 and the polymerization processing microchannel 84 may be obtained through passive manifold design using small hydraulic diameter openings 100 as distribution points from a fixed diameter duct 102. These distribution points 100 use the change in cross-sectional area of the duct 102 bridging the distributed conduits 86, 88, 90, 92 and the polymerization processing channel 84 to meter the needed flow rate. Depending upon the pressure of the contents within the distributed conduits 86, 88, 90, 92, a high velocity inlet stream may result that helps with mixing of the stream flowing through the microchannel 84. The conduits 86, 88, 90, 92 may be used prior to, within, and/or subsequent to, any static mixing section in the processing microchannel 84.

Those of ordinary skill are familiar with the alternatives available to meter a fluid through a fixed diameter duct 102, such as, without limitation, varying the pressure of the contents flowing through the duct 102. It is within the scope of the invention that the additives be pressurized to provide a jetting action as the additives enter the conduits 86, 88, 90, 92 in order to increase mixing between the additives and the contents of the conduits 86, 88, 90, 92. The orientation and spacing of the ducts 102 and openings 100 with respect to the conduits 86, 88, 90, 92 is within the purview of one of ordinary skill, but includes, without limitation, perpendicular jetting action. In addition, the dimensions of the duct 102 can be tailored to the dimensions of one or more of the conduits 86, 88, 90, 92 taking into consideration intended flow distribution and mixing. For example, the dimensions of the duct 102 can vary to decrease the flow resistance in the direction of flow to achieve a more equal flow distribution. The dimensions of the duct 102 can also vary to account for the velocity of the fluid exiting the duct in order to improve mixing.

It is also within the scope of the invention that the additive zones 94, 96, 98 are arranged in an order other than the exemplary order shown in FIG. 5. Likewise, it is also within the scope of the invention to replicate the additive zones 94, 96, 98 in the same or a different order along the length of the polymerization processing microchannel 84 as discussed above. Those of ordinary skill will readily understand the adaptability of the second exemplary embodiment 80 and customization available to meet the specific needs of a particular polymerization process.

It is further within the scope of the invention to that the duct 102 be utilized to direct a lower temperature fluid into direct communication with the contents of the conduits 86, 88, 90, 92 to thermally quench the contents downstream from the polymerization reaction zone.

Figure 6:
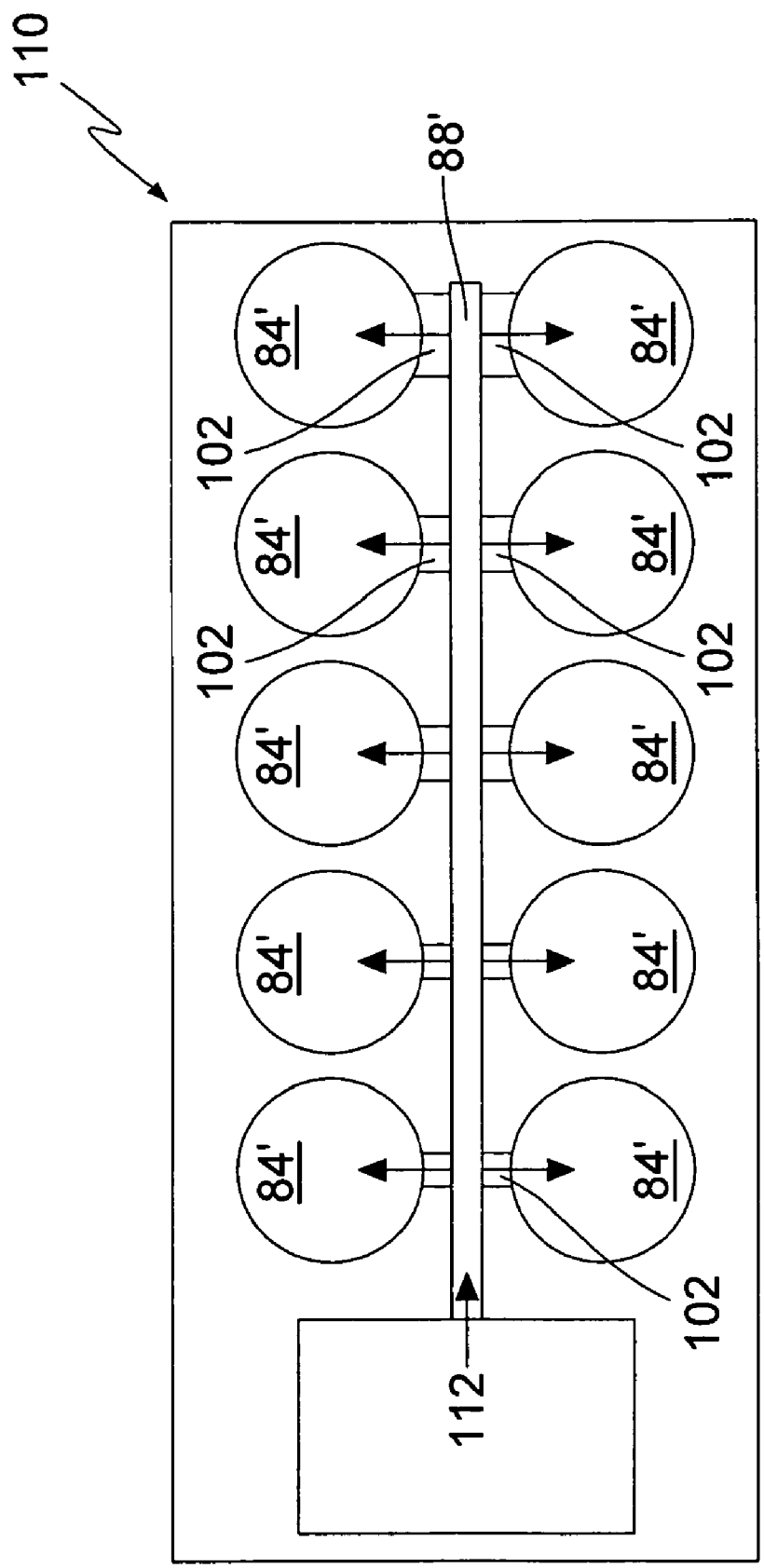
FIG. 6 is a cross-sectional view of a segment of an alternate second exemplary embodiment of the present invention.

Referring to FIG. 6, an second alternate exemplary embodiment 10 includes a plurality of microchannels 84' that are supplied with a particular additive, such as, without limitation, monomer, initiator, water, surfactant, coagulant, and solvent. For purposes of explanation and simplification, only a single additive conduit 88' is shown in fluid communication with the plurality of polymerization process channels 84', where the single conduit is representative of any of a plurality of additive conduits. The embodiment includes an additive source 112 feeding the plurality of polymerization processing microchannels 84' from a single additive conduit 88'. In an exemplary form, the ducts 102' increase in cross sectional area as the distance from the source 112 is increased. One reason for this modification in cross-sectional area of the ducts 102' is that the additive within the additive conduit 88' delivered to the microchannels 84' farther the additive source 112 encounter more frictional resistance, thereby resulting in a higher pressure drop. This exemplary embodiment 110 may be utilized if the dominant flow resistance in the additive conduit 88' is attributable to fractional losses, such as in low Reynolds number flows. The architecture of the source 112, the additive conduit 88', the polymerization processing channels 84', and the ducts 102' are accounted for during the fabrication of the plurality of sheets (See FIG. 5) comprising an operational embodiment 110.

In certain applications, it is preferred to have mixing in the polymerization processing microchannels 84' prior to any static mixing sections in series therewith. The ducts 102' between the additive conduits 88' and the polymerization processing channels 84' may be tailored to increase the mixing of the stream flowing therethrough.

It is also within the scope of the invention that the additive conduit 88' is not formed by the stacked sheet structure, but instead, is mounted to exterior points of the stacked sheet structure to provide fluid communication between the conduit 88' and microchannels 84'. It is likewise within the scope of the invention that heat exchanger channels (not shown) are incorporated into the stacked sheets, possibly interleaved between the polymerization process microchannels 84', to facilitate thermal energy transfer between the heat exchanger channels and the polymerization processing microchannels 84'. Still further, it is within the scope of the invention that the heat exchanger channels are comprised of microchannels.

Figure 7:
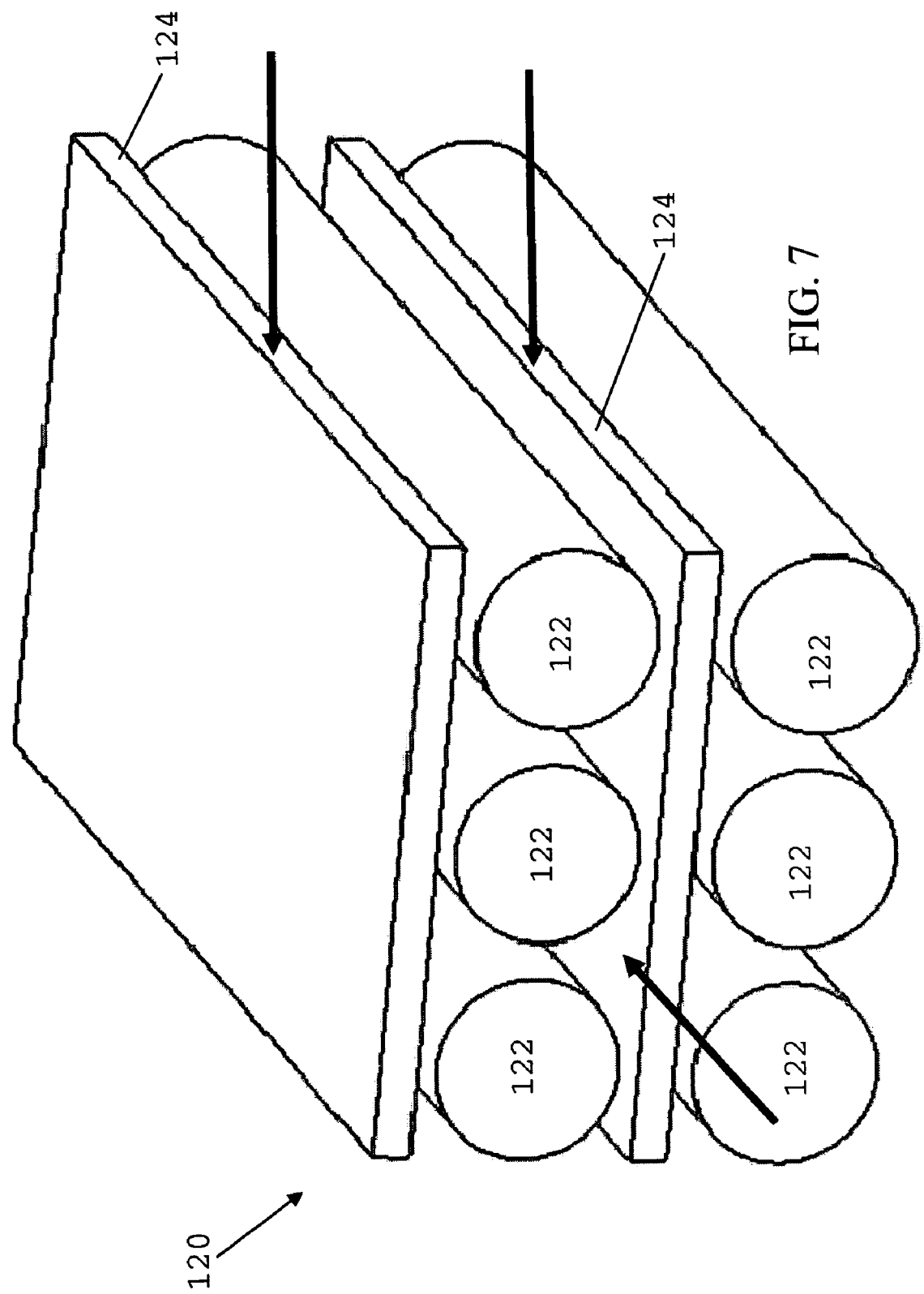
FIG. 7 is an elevated perspective, cross-sectional view of a segment of a third exemplary embodiment.

Referencing FIG. 7, a third exemplary embodiment of the present invention 120 includes a plurality of polymerization process microchannels 122 aligned in parallel and separated by a heat transfer section 124. A plurality of stacked sheets (not shown) may define the dimensions of the polymerization process microchannels 122 as discussed above in the first and second exemplary embodiments. The heat transfer section 124 may comprise a plurality of microchannels carrying a heat exchange fluid therein. In a preferred exemplary embodiment, the flow of the heat exchange fluid is perpendicular or across the flow of the polymerization process stream within the polymerization process microchannels 122.

By optimizing the thermal energy input and distributing the monomer, initiator and solvent feed over the length of polymerization process channels 122, the overall conversion rate of monomer within the polymerization process channels 122 may be increased. Creating reactor and/or mixing zones with different temperatures and heat transfer rates may be accomplished using a heat exchange stream in thermal communication with the polymerization processing channels 122 in concurrent, countercurrent and cross flow directions. In the exemplary embodiment, heat exchange streams are preferably in close geographic proximity to the polymerization processing channels 122 for effective thermal management.

Concurrent and countercurrent single phase heat exchange fluids may provide reactor and/or mixer temperature and heat flux variances across the polymerization process channels 122. If a heat exchange fluid is chosen that may exhibit a phase change during thermal energy exchange, changing temperatures across the polymerization process channels 122 may be limited to superheated vapor and liquid sections before the phase change occurs.

Concurrent and countercurrent heat exchange channels allow for different temperature heat exchange fluids to be distributed to different sections through a number of different structures and methods. One structure/method is to divide the heat transfer sections 124 into separate zones with internal separations and separate distribution manifolds. For example, a separate heat transfer section may be utilized to bring a lower temperature fluid into thermal communication with contents downstream from the reaction zone of the microchannel reactor in order to thermally quench the contents and/or quench/reduce the frequency of chemical reactions. By using separate heat exchange zones, it is also possible to distribute single or multiple phase heat exchange streams at separate temperatures throughout the polymerization process channels 122. If a phase change heat exchange fluid is used, the pressures in each heat exchange section may be changed to modify the boiling point of each separate section of the polymerization process channels 122 for optimized operation.

The use of heat exchange microchannels in close proximity and in thermal communication with the polymerization process channels 122 is important for certain polymerization reactions. As a viscous mixture of monomer and growing polymer chains continues to react the mixture viscosity can increase rapidly. The large growing chains can not diffuse as easily in the mixture, making termination reaction rate drop off substantially. If the propagation of chain growth reaction occurs much more often than initiation and termination, as when the mixture becomes viscous, there can be a sudden increase in rate known as autoacceleration or the Trommsdorff effect. This transition from normal kinetics can be quite sharp and is aggravated by heat or reaction buildup within the polymer mixture increasing the temperature and with it the chain propagation rate. This effect can be delayed in commercial reactors by adding solvent to lower the mixture viscosity and adding initiator to lower the molecular weight of the mixture. However, the microchannel architecture allows for effective thermal energy transfer from the mixture, control over the rate of monomer addition and control over the propagation reaction, and control over the amount of solvent required to keep the viscosity down, and finally control over the Trommsdorff effect to obtain a tight molecular weight distribution for a continuous process.

An additional benefit in utilizing microchannel heat exchangers is the efficient removal of heat load caused by shear heating of highly viscous flows. As the bulk and solution flows reach higher molecular weights the streams become more viscous, so the shear rate at the walls of the polymerization processing channels 122 becomes very high and the losses are converted into internal energy and a temperature rise. This temperature rise may not be welcome when attempting to control the propagation reactions that give rise to the Trommsdorff effect.

Figure 8:
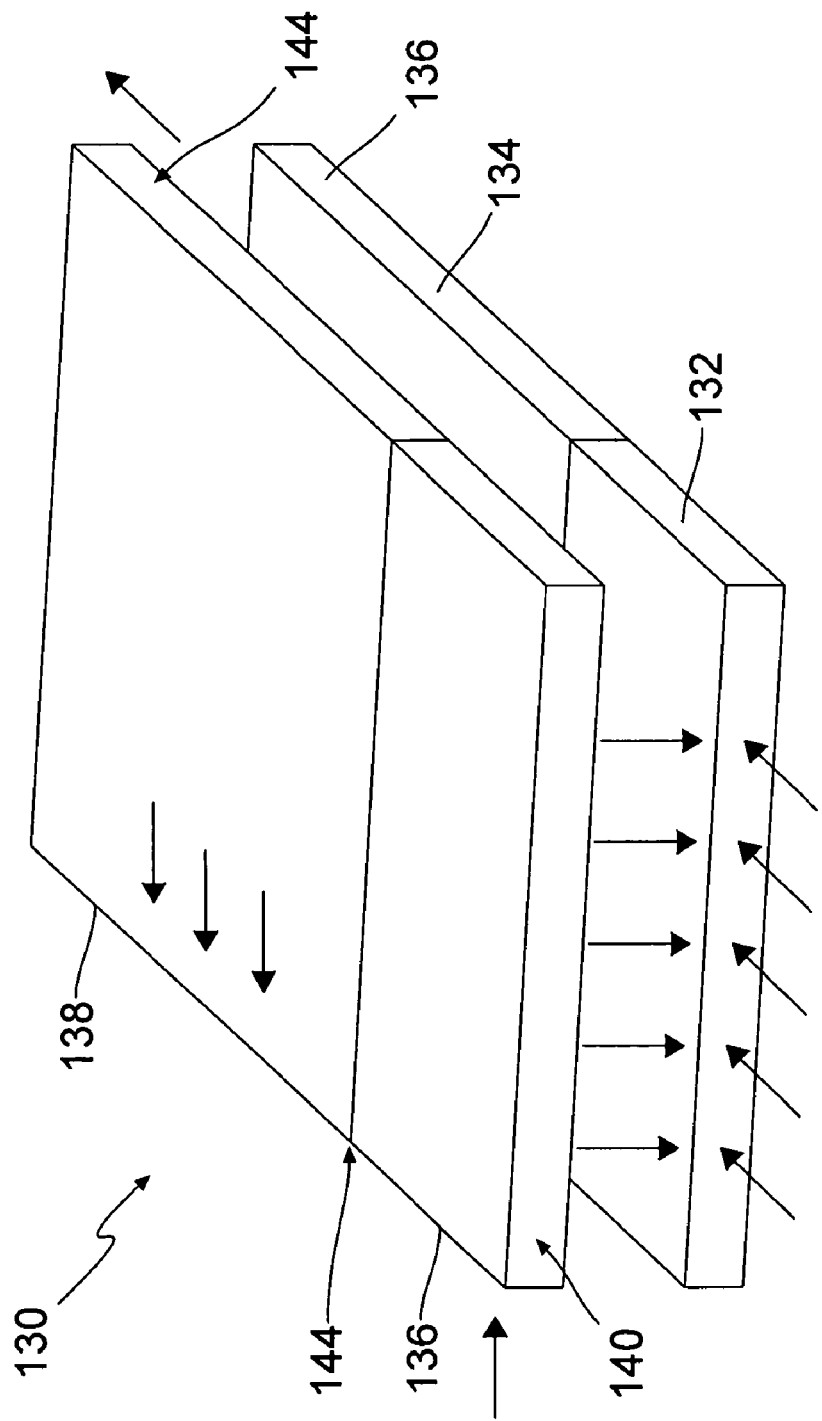
FIG. 8 is an elevated perspective, cross-sectional, exploded view of a repeating unit of a fourth exemplary embodiment.

Referencing FIG. 8, a third exemplary embodiment 130 includes a microchannel mixing zone 132, a distribution zone 136, an active heat exchanger zone 138, and a microchannel reactor zone 134 carrying out and exemplary emulsion or suspension polymerization reaction.

An exemplary process consideration is obtaining a high surface area, highly dispersed organic phase in a continuous aqueous phase through use of a continuous, wall shear stress emulsification process. A porous material 140 may be used to restrict the organic phase flow rate so that when the phase reaches the microchannels of the mixing zone 132 the combination of shear stress and interfacial tension creates droplets. Exemplary porous materials 140 include, without limitation: metallic porous materials made from sintered metal powder, with or without chemical or physical treatment (i.e. coatings); ceramic porous foams with or without physical treatment; structured apertures such as plates with small holes drilled through the channel; and, membrane materials. The organic phase contains monomer alone for the emulsion reaction or monomer and initiator for suspension processes. The aqueous phase has surfactant for suspension process and suspension and water soluble initiator for emulsions. The exemplary embodiment makes use of the porous material 140 between the organic phase and the aqueous phase. Such exemplary materials 140 may provide droplet sizes on the order of 0.1 micrometers and may achieve droplet sizes an order of magnitude smaller. The overall dispersed phase volume percentage of 20% up to 50%, and the higher the volume fraction of dispersed phase the more intense the reaction rate in the stream becomes.

As the emulsion convects downstream from the microchannel mixing zone 132 and enters the microchannel reactor zone 134, active heat exchange channels (not shown) of the active heat exchanger zone 138 may be utilized to transfer thermal energy therefrom. In a further detailed exemplary embodiment, the embodiment 130 comprises a repeating unit that may be repeated to orient a second active heat exchanger zone (not shown) below the microchannel reactor zone 134 to likewise carry thermal energy away therefrom. The active heat exchange channels may be used to remove the exothermic heat of the polymerization reaction and maintain the temperature of the emulsion in a range where the high dispersion can be maintained. For example, the heat exchange channels may be utilized to quickly cool emulsion-type fluids to a temperature below that of the connected phase. Further, the active heat exchange channels may be used to elevate the temperature of a stream to accelerate the polymerization reaction. When the fluid leaves the microchannel reactor zone 94, the reaction should have reached its target conversion. However, it is also within the scope of the invention that the end of the microchannel reactor zone 134 occur prior to the target conversion. Still further, it is also within the scope of the invention that the microchannels comprising the microchannel reactor zone 134 be looped, and not necessarily oriented in a linear manner.

A porous wall 142 is also included to separate the bulk of the organic monomer solution from the polymerization process channels, which preferably comprise microchannels. This porous wall 142 allows passage of the organic monomer solution from one or more distribution points (not shown) into the polymerization processing channels and provides flow resistance for good flow distribution therein. FIG. 8 shows the general direction of the organic monomer into the polymerization process stream flow. By utilizing microchannels as the conduit through which the organic monomer solution flows prior to reaching the porous wall 142, the footprint associated with the conduits may be minimized. However, if additional space is available, larger cross-section conduits may be utilized.

It is also within the scope of the invention to utilize a porous medium as a mixing feature. Exemplary porous media include, without limitation, media having interleaving concourses.

Those of ordinary skill will readily realize the advantages of maintaining the separability of the fluid streams within the third exemplary embodiment 130, except for those locations where fluid communication is desired. By way of example, and not by way of limitation, the third exemplary embodiment 130 includes a hermetic seal 144 between the microchannel reactor zone 134 and the active heat exchanger zone 98. Likewise, a hermetic seal 144 is included between the distribution zone 96 and the active heat exchanger zone 138.

In certain circumstances, it may be advantageous to provide a linear processing channel flow with active heat removal to minimize the shear and surface tension forces that would promote coalescing of the dispersed organic monomer phase. Higher shear stresses induced by changing the stream flow direction or reducing surface tension may undercut the effectiveness of the emulsion reactor. Multiple distribution zone 136 for surfactants downstream of the first mixing zone 132 may be used to increase the rate of emulsion polymerization. For suspension polymerizations this may lead to highly tailored molecular weight distributions because the droplet size limits the amount of monomer that can be reacted and may facilitate excellent heat removal into the surrounding aqueous phase, which in turn can be set to a desired temperature to speed up the reaction.

For emulsion polymerization processes, the smaller monomer droplets can create a system where both the emulsification and solution polymerization are taking place, due to the surface areas being now of the same order per droplet. This can be exploited for the process of seeded polymerizations to make large-particle size latexes.

The active heat exchanger zone 98 should be able to remove exemplary heat loads of the order of 10 $W/cm^2$ for convective boiling, on the order of 1 $W/cm^2$ for single phase laminar convection, and on the order of 0.1 $W/cm^2$ for natural convection.

The architecture of the exemplary embodiments of the present invention may provide static mixing features without additional insertion steps, as well as taking advantage of improved heat and mass transfer in laminar flow through the microchannels. Microchannels provide improved heat and mass transfer in laminar flow because of the small hydraulic diameters of these channels, as compared to larger diameter conduits in laminar flow. As the flow for bulk and solution polymerization reactors increase in polymer molecular weight, the flow becomes nonnewtonian and the viscosity increases. The viscosity can increase by orders of magnitude making the flow even more laminar for the same mass flux rate. The laminar flow regime helps lower overall channel pressure drop via a decrease in the Fanning friction factor loss, which can lead to a decrease in polymer viscosity.

Another microchannel advantage of operating in the laminar flow regime is that as the viscosity increases with polymer chain growth, the heat and mass transfer mechanism does not change at least in part because the flow regime is still laminar. Differences in temperature between laminates of flow are the dominant heat transfer mechanism for laminar flow, so when the Reynolds number drops with increasing viscosity that mechanism will not change.

Following from the above description and invention summaries, it should be apparent to those of ordinary skill in the art that, while the methods and apparatuses herein described constitute exemplary embodiments of the present invention, the invention contained herein is not limited to this precise embodiment and that changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A method of carrying out a polymerization reaction within a microchannel reactor comprising:
   directing at least one of monomer, initiator, water, surfactant, coagulant, and solvent into a reactant stream and into contact with reactant flowing within a first microchannel to initiate a polymerization reaction occurring within a first microchannel; and
   mixing the reactant of the reactant stream by positioning at least one static mixer in series with the reactant stream, where the static mixer is adapted to change a cross-sectional fluid flow profile of the reactant stream flowing through the first microchannel without changing a primary direction of the reactant stream through the first microchannel.

2. The method of claim 1, wherein the act of directing at least one of the monomer, the initiator, the water, the surfactant, the coagulant, and the solvent into the reactant stream includes providing a second microchannel carrying at least one of the monomer, the initiator, the water, the surfactant, the coagulant, and the solvent, where the second microchannel includes an orifice adapted to direct at least one of the monomer, the initiator, the water, the surfactant, the coagulant, and the solvent into the reactant stream at a predetermined point along the first microchannel.

3. The method of claim 1, wherein the act of directing at least one of the monomer, the initiator, the water, the surfactant, the coagulant, and the solvent into the reactant stream includes providing a second microchannel carrying at least one of the monomer, the initiator, the water, the surfactant, the coagulant, and the solvent, where the second microchannel includes a plurality of orifices adapted to direct at least one of the monomer, the initiator, the water, the surfactant, the coagulant, and the solvent into the reactant stream at predetermined points along the first microchannel.

4. The method of claim 1, further comprising cooling the first microchannel by providing a fluid in thermal communication with the first microchannel that is adapted to carry away thermal energy from the reactant stream.

5. The method of claim 1, wherein:
   the first microchannel is bounded by metallic walls and the at least one static mixer is fabricated at least in part from a metallic material; and
   the act of cooling the first microchannel includes conductive heat transfer from the at least one static mixer to the metallic walls of the first microchannel.

6. The method of claim 1, further comprising filtering polymer product from at least one of the monomer, the initiator, the water, the surfactant, the coagulant, and the solvent.

7. The method of claim 6, wherein the act of filtering polymer product includes positioning a permeable membrane in fluid communication with the first microchannel.

8. A method of carrying out a polymerization reaction within a microchannel reactor comprising:
   mixing contents within a first microchannel by positioning at least one static mixer in series with the contents flowing through the first microchannel, where the contents include monomer, and where the at least one static mixer comprises a porous medium operative to change a cross-sectional fluid flow profile of the contents flowing through the first microchannel; and
   reacting at least some of the monomer flowing through the first microchannel to form insoluble polymer product.

9. The method of claim 8, further comprising directing at least one of monomer, initiator, water, surfactant, coagulant, and solvent into the first microchannel to initiate a polymerization reaction occurring within the first microchannel.

10. The method of claim 9, wherein the act of directing at least one of monomer, initiator, water, surfactant, coagulant, and solvent into the first microchannel occurs in staged additions along a length of the first microchannel.

11. The method of claim 10, wherein the act of staging the addition of at least one of monomer, initiator, water, surfactant, coagulant and solvent along the length of the first microchannel includes injecting at least one of monomer, initiator, water, surfactant, coagulant, and solvent through distributed orifices in the first microchannel, where the distributed orifices are sized in response to pressure drops occurring along the length of the first microchannel.

12. The method of claim 11, wherein:
   the act of staging includes staging the monomer along the length of the first microchannel; and
   the act of staging the monomer occurs upstream from at least one static mixer and downstream from at least the one static mixer.

13. The method of claim 8, further comprising conducting heat transfer between the contents of the first microchannel and a fluid flowing through a second fluid conduit, where the heat transfer is at least one of co-current, counter current, and cross-current.

14. The method of claim 8, further comprising separating the insoluble polymer product from the soluble contents flowing through the micro channel.

15. The method of claim 10, wherein:
   the act of staging includes staging the initiator along the length of the first micro channel; and
   the act of staging the initiator occurs upstream from at least one static mixer and downstream from at least the one static mixer.

16. The method of claim 10, wherein:
   the act of staging includes staging the surfactant along the length of the first microchannel; and
   the act of staging the surfactant occurs upstream from at least one static mixer and downstream from at least the one static mixer.

17. The method of claim 8, wherein the act of mixing occurs in at least two stages, where a first stage comprises a first section of the first microchannel that houses at least one porous medium and temporarily the contents flowing therethrough, the first stage being in fluid communication with a first heat transfer fluid so that thermal energy is transferred between the contents and the first heat transfer fluid to maintain the contents flowing through the first stage within a first predetermined temperature band, and
   where a second stage comprises a second section of the first microchannel, downstream from the first stage, that houses at least one porous medium and temporarily the contents flowing therethrough, the second stage being in fluid communication with a second heat transfer fluid to maintain the contents flowing through the second stage within a second predetermined temperature band.

18. The method of claim 17, wherein:
   the first heat transfer fluid flows through a first fluid conduit in conductive thermal communication with the first stage; and the second heat transfer fluid flows through a second fluid conduit in conductive thermal communication with the second stage.

19. The method of claim 18, wherein:
the first fluid conduit comprises a microchannel; and
the second fluid conduit comprises a microchannel.

20. The method of claim 19, wherein the first fluid conduit is in fluid communication with the second fluid conduit.

21. A method of carrying out a polymerization reaction within a microchannel reactor comprising:
flowing a reactant for a polymerization reaction within a first microchannel that includes monomer;
reacting at least some of the monomer within the first microchannel to form insoluble polymer product, where the first microchannel also includes unreacted monomer that together with the insoluble polymer product comprise a slurry; and
temperature quenching the monomer downstream from formation of the insoluble polymer product.

22. The method of claim 21, wherein the act of temperature quenching the monomer occurs as a result of a heat transfer fluid flowing through an adjacent conduit in thermal communication with the monomer.

23. The method of claim 22, wherein:
the act of temperature quenching the monomer occurs as a result of a heat transfer fluid flowing through an adjacent conduit in thermal communication with the macrochannel.

24. The method of claim 23, wherein:
the slurry flows into a filtering porous medium to inhibit insoluble polymer product from passing therethrough, while enabling unreacted monomer to pass therethrough; and
the act of temperature quenching the monomer occurs downstream from the filtering porous medium.

25. The method of claim 24, wherein the adjacent conduit in thermal communication with the monomer is a microchannel.

26. The method of claim 22, wherein:
the slurry flows into a microchannel; and
the act of temperature quenching the monomer occurs as a result of a heat transfer fluid flowing through an adjacent conduit in thermal communication with the micro channel.

27. The method of claim 26, wherein:
the microchannel includes a filtering porous medium to inhibit insoluble polymer product from passing therethrough, while enabling unreacted monomer to pass therethrough;
the act of temperature quenching the monomer occurs downstream from the filtering porous medium.

28. The method of claim 27, wherein the adjacent conduit in thermal communication with the monomer is a microchannel.

29. The method of claim 21, wherein the act of temperature quenching the monomer is operative to reduce the temperature of the monomer between 25-200° C.

30. The method of claim 21, further comprising the act of staging the addition of at least one of monomer, initiator, water, surfactant, coagulant and solvent along the length of the first microchannel.

31. The method of claim 30, wherein the act of staging occurs through distributed orifices in the first microchannel, where the distributed orifices are sized in response to pressure drop along the length of the first microchannel.

32. The method of claim 21, further comprising mixing the monomer using a plurality of spaced apart static mixers.

33. The method of claim 21, wherein the act of temperature quenching includes a heat transfer fluid flowing through a heat transfer conduit, where the heat transfer fluid is flowing with respect to the monomer in at least one of co-current, counter current, and cross-current.

34. The method of claim 21, further comprising the act of separating the insoluble polymer product from the monomer flowing through the first microchannel.

35. The method of claim 21, further comprising the act of staging initiator along the length of the first microchannel, where the act of staging the initiator occurs upstream from at least one static mixer and downstream from at least the one static mixer.

36. The method of claim 21, further comprising the act of staging surfactant along the length of the first microchannel, where the act of staging the surfactant occurs upstream from at least one static mixer and downstream from at least the one static mixer.

37. A method of flowing material through a microchannel comprising:
staging the addition of a material along a length of a microchannel directly into a volumetric cavity defined by the microchannel, where the staged addition occurs through orifices communicating with the microchannel, where the orifices are increased in size along a length of the microchannel, and where the size of the orifices allows substantially the same volume of material to exit each orifice responsive to pressure drop along the length of the microchannel.

* * * * *